United States Patent [19]
Faure et al.

[11] Patent Number: 5,469,531
[45] Date of Patent: Nov. 21, 1995

[54] PROCESS FOR HYBRID POSITION/FORCE CONTROL FOR A ROBOT MANIPULATOR

[75] Inventors: Serge Faure, Chuzelles; Alain Gaillet, Toulouse; Régis Lefebvre, Ecully; Claude Reboulet, Labege, all of France

[73] Assignee: Potain, Ecully, France

[21] Appl. No.: 183,230

[22] Filed: Jan. 19, 1994

[30] Foreign Application Priority Data

Jan. 19, 1993 [FR] France .................................. 93 00681

[51] Int. Cl.$^6$ ...................................................... G06F 15/50
[52] U.S. Cl. .............................. 395/86; 395/80; 395/97; 901/9; 901/15
[58] Field of Search .............................. 318/568.1, 568.2, 318/568.17, 568.11; 364/424.02, 174, 424.01; 395/84–87, 80–82, 94–99; 901/9–15

[56] References Cited

U.S. PATENT DOCUMENTS

| | | | |
|---|---|---|---|
| 4,621,332 | 11/1986 | Sugimoto et al. | 395/95 |
| 4,974,210 | 11/1990 | Lee | 395/95 |
| 5,038,089 | 8/1991 | Szakaly | 318/568.11 |
| 5,047,916 | 9/1991 | Kondo | 395/99 |
| 5,129,044 | 7/1992 | Kashiwagi et al. | 395/86 |
| 5,217,344 | 6/1993 | Gendrault et al. | 414/729 |

FOREIGN PATENT DOCUMENTS 3810691 10/1988 Germany .......................... B25J 13/00

OTHER PUBLICATIONS

Nguyen, Charles C. "Analysis And Implementation Of A 6 DOF Stewart Platform–Based Force Sensor For Passive Compliant Robotic Assembly." IEEE Proceedings Of The Southeastcon '91. vol. 2, 1991. pp. 880–884.

Primary Examiner—David K. Moore
Assistant Examiner—Tariq Rafiq Hafiz
Attorney, Agent, or Firm—Browdy and Neimark

[57] ABSTRACT

The invention relates to the control of robot manipulators comprised of a macro-manipulator combined with a micro-manipulator with a load grasping device. The control is accomplished from set-point values of force ($F^d$) and set-point values of position ($\chi^d$), which are compared to real values ($F^m$, $\chi^m$) in order to produce increments of displacement ($\Delta x$, $\Delta y$, $\Delta z$, $\Delta\theta x$, $\Delta\theta y$, $\Delta\theta z$) intended for the load grasping device. Added to values ($\chi^m$) representing the actual position, these increments yield new set-point values of position ($\chi'^d$) of the load grasping device. These set-point values are distributed (at 29) between the macro-manipulator and the micro-manipulator, taking into account the deformation ($\Delta X^\wedge$) and the mobility that are acceptable for the macro-manipulator. Specific application: robot manipulator of large size and high capacity for outdoor use, especially on construction sites.

11 Claims, 2 Drawing Sheets 5,469,531

PROCESS FOR HYBRID POSITION/FORCE CONTROL FOR A ROBOT MANIPULATOR

FIELD OF THE INVENTION

The present invention relates to a process for hybrid position/force control for a robot manipulator of the type which comprises a macro-manipulator connected to a micro-manipulator with a load-grasping device.

DESCRIPTION OF THE RELATED ART

This invention applies most particularly, but not: exclusively, to the control of a robot manipulator of large size and high capacity for outdoor use, especially on construction sites, such as those described in the French Patent Application No. 89 14613, published as Patent No. 2 653 761. Such a robot manipulator comprises:

- a motorized carrier, constituting the "macro-manipulator," with a slender structure (of large longitudinal dimension and relatively small transverse dimension), elastically deformable, constituted essentially by a mast swivelling around a substantially vertical axis and by an arm articulated at the top of the mast around a substantially horizontal axis and fabricated of several parts articulated to each other around axes parallel to the preceding, this arm opening out and folding in within the vertical plane passing through the axis of rotation of the mast;
- a motorized, telescopic and swivelling compensating arm, constituting the "micro-manipulator," with a structure of low inertia relative to the carrier, which has at least one degree of redundant freedom and is equipped with a grasping device mount for detecting forces in active compliance, which compensating arm may be embodied according to the principle of the Stewart platform (or any other type of parallel manipulator);
- a motorized linkage of the compensating arm with the end of the arm of the carrier;
- apparatus for operation and control of the motorization of the carrier, of the compensating arm, and of the linkage of the compensating arm with the carrier;
- apparatus for power supply and of control/operation of a grasping device supported by the grasping device mount;

It will also be noted that the carrier and the manipulating arm of such a robot manipulator are comprised of a certain number of actuating gears, which in practice are geared swivelling motors and various jackscrews, with automatic controls, as well as position sensors, linked with these actuating gears. The carrier, otherwise called the macro-manipulator, is capable of executing large displacements, using automatic position controls. The compensating arm, that is to say the micro-manipulator, executes small displacements and has automatic position and force controls; thus it comes into play in particular during the phases of operation which involve contact with the environment. Therefore, in practice, in a cycle of material handling performed by the robot manipulator, the compensating arm comes into play, in particular, at the point of seizing a load and at the point of letting go of a load. At the time of these sequences, the control of forces is, in fact, essential.

Considering, in particular, the sequence of grasping a load, for example one that is initially sitting on the ground, it is appropriate to transfer the entire weight of the load from the ground to the robot, placing the robot under stress without displacing the grasping device, which implies:

- acting on the carrier in order to progressively compensate for its deformation, that is to say the combined effect of its displacements in translation and in rotation in space, depending on its configuration and its load-bearing state;
- acting on the compensating arm in order to maintain the grasping device in position until the load is let go.

The problem presents itself in similar terms in the sequence of setting down the load when the robot is relieved (modification of the state of internal constraints) and when it is appropriate to transfer the entire weight of the load from the robot to the plane of deposit, without displacing this load.

SUMMARY OF THE INVENTION

The control of forces also comes into play with the activation of certain of the robot's modes of functioning, and more generally, the hybrid position/force control must allow control of the position of the grasping device of the robot according to certain degrees of freedom, while controlling the forces that the grasping device exerts on the environment according to the complementary degrees of freedom. As a reminder, it is recalled here that the total number of degrees of freedom is equal to 6, and the hybrid position/force control consists in controlling N degrees of freedom of force, and the (6–N) other degrees of freedom of position. In this context, "position" signifies "position of a point" as well as "orientation, just as "force" signifies "stress" as well as "torque." It must also be considered that, in a hybrid control, the robot interprets and executes macro-commands (or primitives), which are pre-defined functions, relating to the tasks to be carried out. For example, in a sequence of letting go of a load, the macro-command can involve the automatic control of force according to three degrees of freedom, and the automatic control of position according to the three complementary degrees of freedom. The hybrid control also makes use of various functional guide marks, in particular, a guide mark attached to the base of the robot, a guide mark attached to the base of the compensating arm (or to the end of the carrier), a guide mark attached to the moving plate of the compensator, a "task" guide mark fixed in relation to the environment, and a guide mark linked to the load to be manipulated. Taking into account the structure of the carrier and of the manipulating arm defines the "inverse geometric model" of the carrier, as well as the "inverse geometric model" of the compensating arm, that is to say the relationships which define, for each position of the carrier or of the compensating arm expressed in Cartesian coordinates, the corresponding set-point values to send to the articulations of the robot, which will simply be referred to as the "articular set-point values."

The considerations to which the inventors have devoted their attention have led them to envision four different strategies for the grasping and letting go of loads along a vertical axis, in which, respectively:

- the carrier alone plays an active role;
- the compensating arm alone plays an active role;
- the carrier and the compensating arm are active sequentially;
- the carrier and the compensating arm are active simultaneously.

The last strategy has proven to be the most advantageous, particularly in making it possible to limit the displacements of the compensating arm in relation to its median position, with a displacement of the carrier coming into play if the instantaneous position of the compensator deviates excessively from its median position,. causing a limitation of the dimensioning of the compensating arm. Another advantage is the ability to lower a load behind an obstacle and to seek contact "blindly," that is to say without having a priori knowledge of the exact level of the ground or of the plane of deposit.

The process for control according to the invention thus lies within the scope of this last strategy, and it aims principally to determine the distribution of forms of mobility between the carrier and the compensating arm or, in generalizing the problem and its solution, between the macro-manipulator and the micro-manipulator.

To this end, in the process for hybrid position/force control for a robot manipulator according to the invention:

N set-point values of force of contact of the grasping device or of the load with the environment and (6–N) set-point values of the position of the grasping device, which correspond respectively to the six degrees of freedom of the space, are input;

all these set-point values are compared to real values furnished by the respective sensors of force and of position, thus producing values of deviation;

the values of deviation are translated into increments of displacement intended for the load-grasping device;

the increments of displacement are added to the values representing the actual position, in order to constitute new set-point values of position of the load-grasping device;

the new set-point values of the position of the load-grasping device, while taking into account the real position of the macro-manipulator and of its deformation, are assigned to the micro-manipulator;

these new set-point values of position are translated, by a transformer of coordinates, into articular set-point values intended for the automatic controls of the actuating gears of the micro-manipulator, these virtual set-point values of position, taking into account the deformation and the initial position of the macro-manipulator, are directed to the macro-manipulator;

these virtual set-point values are distributed, on one hand, as set-point values of position effectively directed to the macro-manipulator, and on the other hand, as set-point values not realizable by the macro-manipulator which are directed to the micro-manipulator;

the set-point values of position effectively addressed to the macro-manipulator are translated, by a transformer of coordinates, into articular set-point values intended for the automatic controls of the actuating gears of the macro-manipulator.

Thus, this process for hybrid control takes into account the fact that not all the degrees of freedom are acceptable for the macro-manipulator, which is the case of the carrier in the particular application being considered here in order to demonstrate the problem. It will also be noted that with the process according to the invention, it is not until after the desired position of the load-grasping device has been restored that the distribution of the set-point values between the macro-manipulator and the micro-manipulator is realized. It is here that the corrective displacements for cancelling out the deviations of automatic control from the hybrid set-point values are executed in the micro-manipulator, while the position of the macro-manipulator is independently corrected from its deformations. It must be noted that the deformations can be input from a table of previously stored values, or by means of calculation (mathematical model).

According to one implementation of the process according to the invention, the set-point values directed to the macro-manipulator are established in such a way that the macro-manipulator occupies a constant position in space, in the course of a sequence of grasping or letting go of a load.

In a variant of this process, the set-point values directed to the macro-manipulator are established in such a way that the macro-manipulator occupies an adjustable position, in the course of one sequence of grasping or letting go of a load, so as to reduce the deviation between the real position and the median position of the micro-manipulator.

The invention also includes the particular industrial application of the above described process for hybrid position/force control to a robot manipulator of large size and high capacity for outdoor use, with a motorized carrier constituted by a swivelling mast and by an unfoldable arm in several elements articulated to one another, and with, at the end of the unfoldable arm, a motorized compensator equipped with a grasping device mount for detecting forces in active compliance, in which the carrier constitutes the macro-manipulator and the compensator constitutes the micro-manipulator, the process thus ensuring the distribution of forms of mobility between the carrier and the compensator, while controlling the forces of contact in the course of sequences of grasping and letting go of a load.

BRIEF DESCRIPTION OF THE DRAWINGS

In any case, the invention will be better understood with the aid of the description which follows, in reference to the appended schematic drawing which illustrates, by way of non-limiting example, several implementations of this process, in relation to a particular application.

DESCRIPTION OF THE PREFERRED EMBODIMENT

Figure 1:
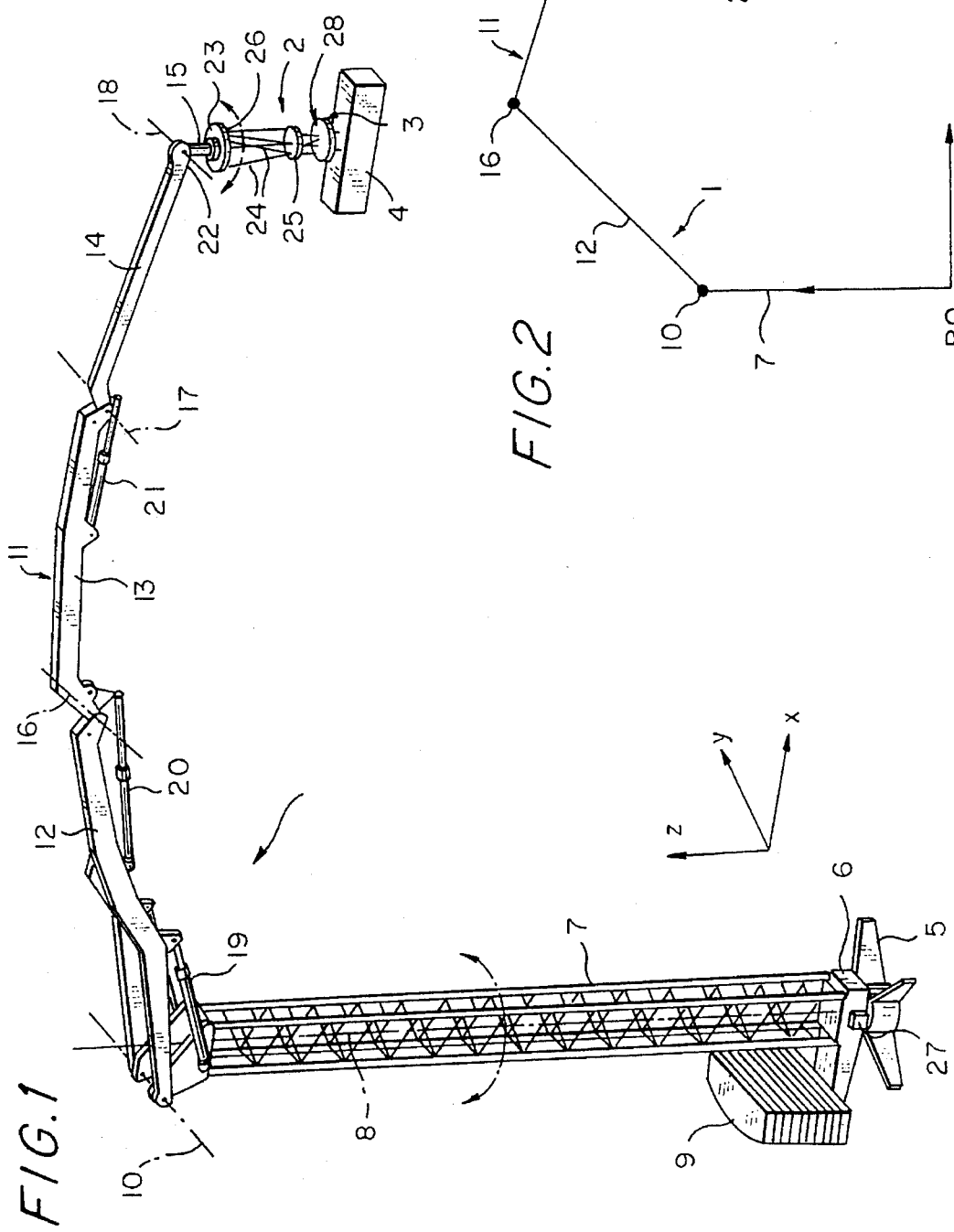
FIG. 1 is a general layout, in perspective, of a robot manipulator which can be controlled by the process that is the object the invention.

FIG. 1 shows the structure of a robot manipulator of large size and high capacity for outdoor use, such as has already been described in the French Patent Application No. 89 14613, published as Patent No. 2 653 761. Generally, this robot manipulator is comprised of a motorized carrier 1 of large size, with a slender structure that is elastically deformable, and a motorized compensator 2 with a structure of low inertia, which supports a load-grasping device 3 suitable for seizing a load 4.

The carrier 1, also called the macro-manipulator, consists of a fixed or movable underframe 5, which assures connection with the ground on the site where the robot is installed and utilized. The fixed or movable underframe 5 supports, by means of a motorized swivelling device, a rotating underframe 6, on which a mast 7 is mounted, and is thus made rotatable around a vertical axis 8. A balancing rotating ballast 9 is also mounted on the rotating underframe 6, behind the base of the mast 7.

Mounted at the top of the mast 7, around a horizontal axis 10, is an arm 11 that opens out and folds in, which is fabricated of several successive elements 12, 13, 14, 15 articulated to one another around horizontal axes 16, 17 and 18, parallel to the axis 10.

The motorization of the carrier 1 is provided by jackscrews 19, 20, 21, 22 which, respectively, provide for the swivelling of the first element 12 of the arm 11 in relation to the mast 7, the swivelling of the second element 13 in relation to the first element 12, the swivelling of the third element 14 in relation to the second element 13, and the swivelling of the fourth element 15 relative to the third element 14, the fourth and last element 15 remaining substantially vertical in the course of operation.

The arm 11 of the carrier 1 is extended at its front end, thus below element 15, by the compensator 2, also called the micro-manipulator. The compensator 2 is embodied here according to the principle of the Stewart platform. Thus it comprises an upper disk 23 which is substantially horizontal, connected by six jackscrews 24 to a lower disk 25. A motorized linkage 26 which allows for the rotation of the compensator 2 is provided between the last element 15 of the arm 11 of the carrier 1, and the upper disk 23 of the compensator 2. The load grasping device 3 is mounted under the lower disk 25 of the compensator 2.

Generally, the jackscrews 19, 20, 21, 22, 24, and the geared swivelling motors constitute the "actuating gears" of the robot manipulator. The carrier 1 with its various actuating gears, which include the geared swivelling motor 27 of the mast 7, allows high-amplitude displacements of the load 4 or of the load grasping device 3 when empty. The compensator 2 with its own actuating gears (jackscrews 24) allows for final positioning of the load 4 or the load grasping device 3, with faster movements of low amplitude, particularly at the time of grasping the load 4 and of letting it go. The sensors of force 28 supported by the compensator 2, like for example the sensor described in the French Patent Application No. 88 05919, published as Patent No. 2 631 118, also come into play at the time of these sequences.

More specifically, the grasping or letting go of a load involves the progressive transfer of the weight of the load 4 from the ground to the robot manipulator or inversely, the actuating gears provide progressive correction of the deformation of the structure of the robot manipulator in relation to its load, while the sensors of force 28 allow the horizontal forces and the torques of contact to be controlled at a value of zero. The hybrid position/force control allows control of the carrier 1/compensator 2 assembly, while maintaining the grasping device 3 in position and compensating for the deformation of the carrier 1.

Figure 2:
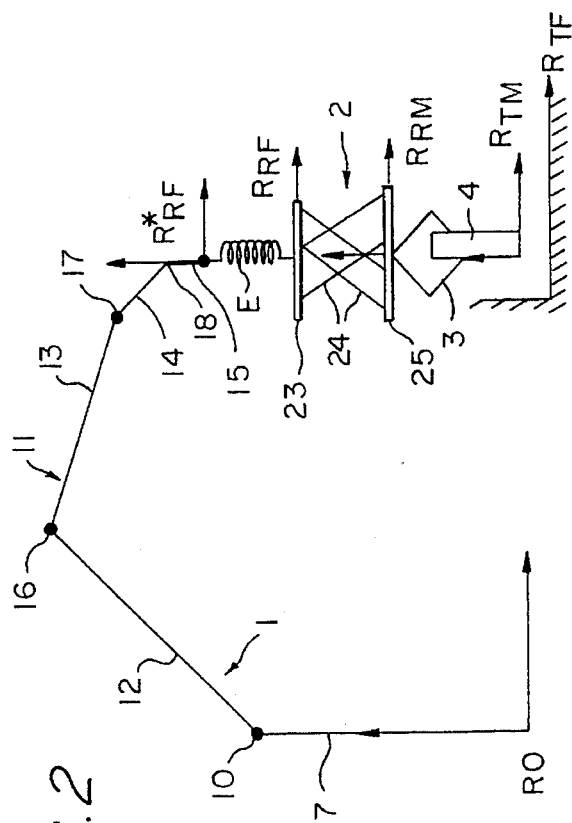
FIG. 2 is a view which presents the robot manipulator of FIG. 1, with the associated guide marks, in diagrammatic form.

In the diagram in FIG. 2, the structure of the robot manipulator appears in simplified form (the elements correspond to those in FIG. 1 that are designated by the same reference numerals). The elastic linkage, indicated with E between the end of the arm 11 and the compensator 2, symbolizes the elasticity and the corresponding deformation. This diagram also indicates the principal orthonormated guide marks necessary for the implementation of the hybrid control according to the invention:

guide mark Ro attached to the base of the carrier 1;

guide mark RRF attached to the upper disk 23 of the compensator 2 (designated RRF in the absence of deformation, assuming the carrier 1 to be rigid);

guide mark RRM attached to the lower disk 25 of the compensator 2;

mobile guide mark RTM linked to the load 4;

fixed "task" guide mark RTF linked to the ground or to the site of grasping or letting go of the load 4.

Figure 3:
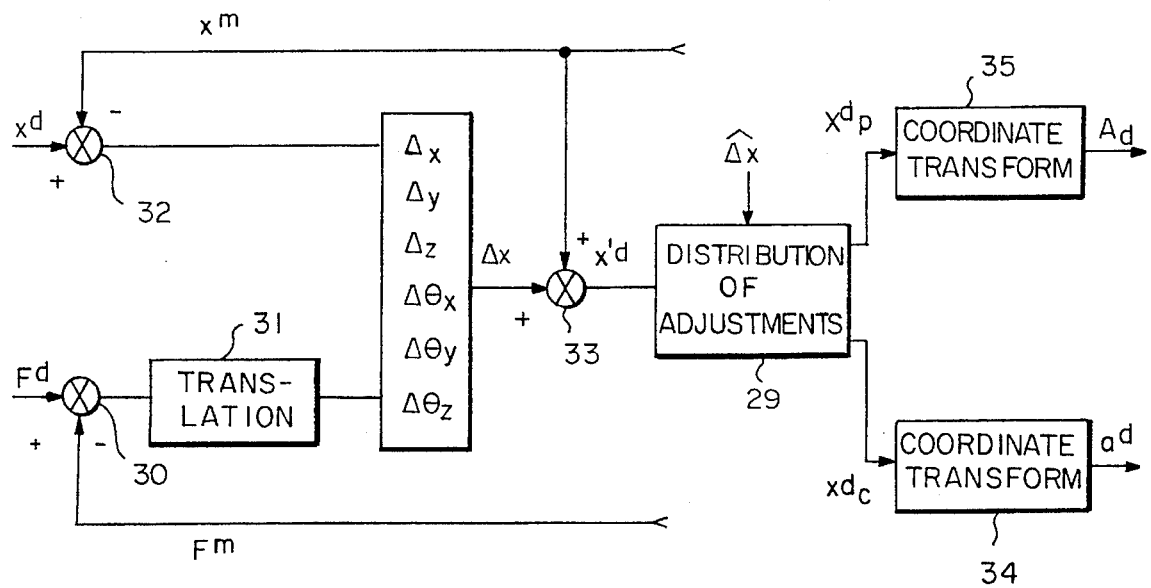
FIG. 3 is a basic diagram of the hybrid position/force control according to the invention.

The basic concept of the control consists of producing increments of displacement $\Delta x$, whose components are expressed as $\Delta x, \Delta y, \Delta z, \Delta \theta y, \Delta \theta z$ which, when added to the regular position, constitute the new reference point of the position to be attained. FIG. 3 illustrates, in the form of a simplified diagram, how the hybrid controls of force $F^d$ and of position $x'^d$ are combined in order to provide an increment of displacement $\Delta x$ of the load grasping device 3, without concern for the forms of mobility permitted by the carrier 1 and the compensator 2. It is not until after the desired position $x^d$ of the load grasping device 3 has been restored that the distribution of set-point values between the carrier 1 and the compensator 2 is achieved, in a unit for the distribution of forms of mobility 29 which is detailed in FIG. 4.

The N set-point values of force $F^d$ (stress or torque) corresponding to as-many degrees of freedom are input and compared at 30 to the real values of force $F^m$ provided by the sensors of force 28 of the compensator 2. The N values of deviation of force, thus obtained, are converted into values of deviation of position (translation or orientation) at 31, where they are multiplied by a matrix of gain selected as the approximate reciprocal value of the rigidity of the carrier 1.

At the same time, the (6–N) set-point values of position $x^d$, corresponding to as many complementary degrees of freedom, are input and compared at 32 to the real values of position $x^m$, provided by the exteroceptive (external) sensors; (6–N) values of deviation of position are also produced.

This also produces within the assembly the six increments of displacement $\Delta x, \Delta y, \Delta z, \Delta \theta x, \Delta \theta y, \Delta \theta z$, designated globally by $\Delta x$, which are added at 33 to the corresponding real values of position $x^m$, in order to provide new set-point values of position $x'^d$ of the load grasping device 3.

These new set-point values of position $x'^d$ are input into the distribution unit 29, which also receives a value estimated from the deformation $\Delta X^{\char`\^}$, which can be a vector of dimension 3, 4, 5, or 6, depending upon the content of the table of deformations.

The distribution unit 29, considered globally here, delivers set-point values of position $x^d_c$ assigned to the compensator 2, and other set-point values of position $x^d_p$ assigned to the carrier 1, these set-point values taking into account the deformation $\Delta X^{\char`\^}$. Since here it is a matter of Cartesian set-point values of position, a transformer of coordinates 34 converts the set-point values $x^d_c$ into articular set-point values $a^d$ intended for the automatic controls of the actuating gears of the compensator 2. In a similar way, another transformer of coordinates 35 converts the set-point values $x^d_p$ into articular set-point values $A^d$ intended for the automatic controls of the actuating gears of the carrier 1. The two transformers of coordinates 34 and 35, respectively, take into account the inverse geometric model of the compensator 2 and the inverse geometric model of the carrier 1.

Figure 4:
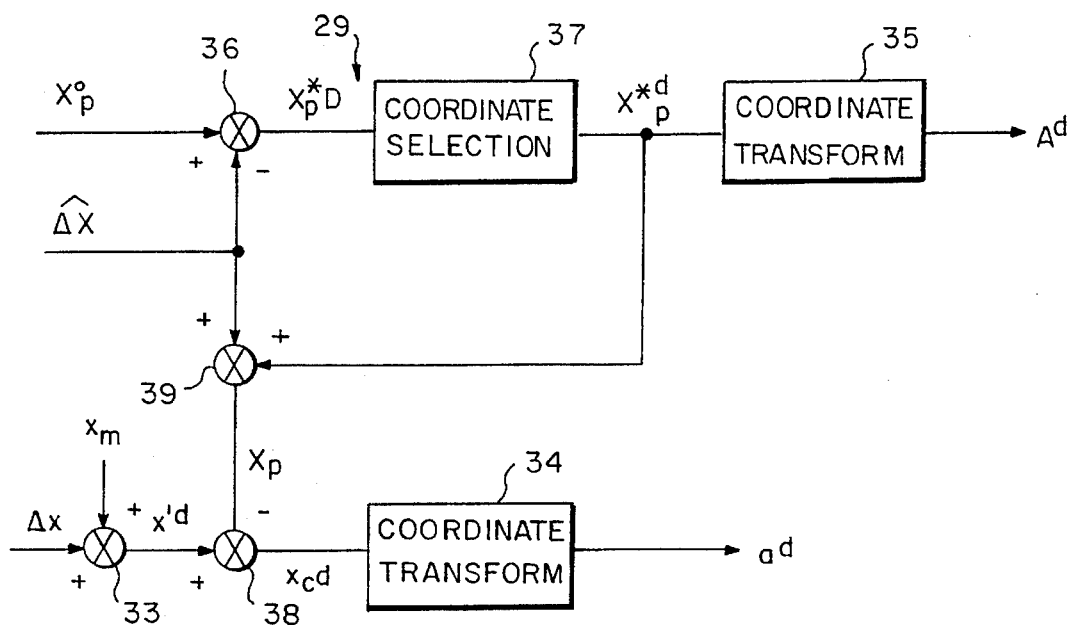
FIG. 4 is a more detailed basic diagram illustrating the distribution of forms of mobility in this process.

Reference is now made to FIG. 4 for a more detailed explanation of the distribution of forms of mobility between the carrier 1 and the compensator 2, taking into account that not all the degrees of freedom are acceptable for the carrier 1. In particular, the vertical plane of the carrier 1 can be blocked off during the phase of hybrid control, and any inclination of the carrier around an axis located in the horizontal plane x y may also be impossible. It is recalled that in phase with hybrid control, the retained strategy consists of having the micro-manipulator, here the compensator 2, execute the corrective displacements intended to cancel out the deviations of automatic control of the hybrid set-point values (force and position), while independently correcting the position of the macro-manipulator, also called the carrier 1, taking into account the deformation $\Delta X^\wedge$.

In the most general case, it can be assumed here that the deformation $\Delta X^\wedge$ is expressed by a vector with six components. At each step of calculation, the new reference point of position resulting from the estimate of the deformation must take into account the forms of mobility that are acceptable for the carrier 1. It is thus necessary to project this reference point into the working sub-area of the carrier, and then it remains for the compensator 2 to deal with the missing part (complementary subarea).

This operating mode is presented in diagrammatic form in FIG. 4, where:

$X^o_p$ represents the position of the carrier 1 also called the position of the end of the arm 11 (or of the superior disk 23 of the compensator 2) which, it is desired here, will remain constant throughout the duration of execution of the hybrid-type macro-control;

$X^*_pD$ represents the desired position for the carrier 1, assumed to be rigid, this "virtual" set-point value of position taking into account the deformation $\Delta X^\wedge$, which is subtracted at 36 from the position $X^o_p$;

37 indicates the operation of projection of the set-point value $X^*_p d$ in the working sub-area of the carrier 1, taking into account the acceptable forms of mobility;

$X^*_p d$ represents the result of this operation of projection, that is to say the set-point value of position actually assigned to the carrier 1 and usable by the actuating gears of this carrier, after translation into articular set-point values $A^d$ by the transformer of coordinates 35;

$x^d_c$ represents the set-point value of position assigned to the compensator 2, that is to say the part that the compensator 2 must extract:, by displacement of its secondary disk 25 relative to its primary disk 23;

Xp represents the position of the end of the carrier 1, which is subtracted at 38 from the set-point value $\chi'^d$ in order to form the set-point value $x^d_c$ assigned to the compensator 2; for instance: $x^d_c = \chi'^d - Xp$.

39 designates an operation of addition, which provides an estimate of the magnitude Xp as the position $X^*_p d$ of the carrier 1, which is assumed to be rigid, is corrected by the deformation $\Delta X^\wedge$, for instance: $Xp = X^*_p d + \Delta X^\wedge$.

In this way, the set-point values that are not admissible by the carrier 1 are directed to the compensator 2, and they meet again in the Cartesian set-point values $x^d_c$, finally translated into articular set-point values $a^d$ as already described above.

Whereas the description just given for the distribution of forms of mobility originates from a desired constant position $X^o_p$ of the carrier 1, one variant of implementation of the process consists of readjusting the position of the carrier 1 in the course of a sequence of grasping or letting go of a load, in order to reduce the deviation between the real position of the compensator 2 and its median position.

Of course, the invention is not limited to only the modes of implementing this process for hybrid position/force control that have been described above, by way of examples; on the contrary, it encompasses all the variants of execution and of application that observe the same principal. Thus, the scope of the invention will not be deviated from by way of partial modifications of the process remaining within the scope of equivalent techniques, or by way of applying this process to robot manipulators other than the particular example described here, provided that these robots maintain a structure with macro-manipulator, micro-manipulator and load-grasping device.

We claim:

1. A process for hybrid position/force control for a robot manipulator for grasping a load (4), of the type which comprises a macro-manipulator (1) connected to a micro-manipulator (2) with a load grasping device (3), the process comprising:

inputting N set-point values of force ($F^d$) of contact of the load grasping device (3) or of the load (4) with the environment, and (6–N) first set-point values of position ($\chi^d$) of the load grasping device (3), which correspond respectively to the six degrees of freedom of space;

comparing the set-point values of force and the first set-point values of position ($F^d$, $\chi^d$) (at 30, 32) respectively to real force values and real position values ($F^m$, $\chi^m$) input by respective sensors of force (28) and of position, to produce values of deviation;

translating the values of deviation (at 31) into increments of displacement ($\Delta x$, $\Delta y$, $\Delta z$, $\Delta\theta x$, $\Delta\theta y$, $\Delta\theta z$) for controlling the load grasping device (3);

adding the increments of displacement (at 33) to the real position values ($\chi^m$) which represent an actual position, in order to constitute second set-point values of position ($X'^d$) of the load grasping device (3);

adjusting the second set-point values of position ($\chi'^d$) of the load grasping device (3), by taking into account (at 29) real micro-manipulator position (Xp) of the macro-manipulator (1) and a macro-manipulator deformation ($\Delta X^\wedge$) to yield third set-point values of position ($X^d_c$);

transforming the third set-point values of position ($X^d_c$) by a micro-manipulator manipulator transformer of coordinates (34) into articular micro-manipulator set-point values ($a^d$) for controlling micro-manipulator automatic controls of micro-manipulator actuating gears (24) of the micro-manipulator (2);

controlling the micro-manipulator actuating gears using the articular micro-manipulator set-point values ($a^d$);

directing to the macro-manipulator virtual set-point values of position ($X^*_pD$), taking into account the deformation ($\Delta X^\wedge$) and an initial position ($X^o_p$) of the macro-manipulator (1);

selectively distributing the virtual set-point values ($X^*_pD$) (at 37) between realizable set-point values of position ($X^*_pD$) directed to the macro-manipulator (1) and non-realizable set-point values that are not realizable by the macro-manipulator (1) and which are directed to the micro-manipulator (2);

transforming the virtual set-point values of position ($X^*_p d$) by a macro-manipulator transformer of coordinates (35) into articular macro-manipulator set-point values ($A^d$) for controlling macro-manipulator automatic controls of macro-manipulator actuating gears (19, 20, 21, 22, 26, 27) of the macro-manipulator (1); and controlling the macro-manipulator actuating gears using the articular macro-manipulator set-point values ($A^d$).

2. The process according to claim 1, wherein the set-point values ($X^o_p$) directed to the macro-manipulator (1) are established in such a way that the macro-manipulator (1) occupies a constant position in space, in the course of a sequence of grasping or letting go of a load (4).

3. The process according to claim 2, wherein the set-point values of position ($x^d_c1$) assigned to the micro-manipulator (2), result from a subtraction (at 38), from the set-point values of position ($\chi'^d$) of the load grasping device (3), of a magnitude (Xp) which represents the real position of the macro-manipulator (1), which magnitude (Xp) itself is estimated from the position ($X^*_p d$) of the macro-manipulator (1), which is assumed to be rigid, and is corrected (at 39) by the deformation ($\Delta X^\wedge$).

4. The process according to claim 3, including application to a robot manipulator of large size and high capacity for outdoor use, with a motorized carrier (1), constituted by a swivelling mast (7) and an unfolding arm (11) in several elements (12, 13, 14, 15) articulated to one another, and which has, at the end of the unfolding arm (11), a motorized compensator (2) equipped with a grasping device mount fox detecting forces in active compliance, in which the carrier (1) constitutes the macro-manipulator and the compensator (2) constitutes the micro-manipulator, the process ensures the distribution of forms of mobility between the carrier (1) and the compensator (2), while controlling the forces of contact in the course of operations of grasping and letting go of a load (4).

5. Process for hybrid position/force control for a robot manipulator according to claim 2, characterized by its application to a robot manipulator of large size and high capacity for outdoor use, with a motorized carrier (1), constituted by a swivelling mast (7) and an unfolding arm (11) in several elements (12, 13, 14, 15) articulated to one another, and which has, at the end of the unfolding arm (11), a motorized compensator (2) equipped with a grasping device mount for detecting forces in active compliance, in which the carrier (1) constitutes the macro-manipulator and the compensator (2) constitutes the micro-manipulator, the process ensures the distribution of forms of mobility between the carrier (1) and the compensator (2), while controlling the forces of contact in the course of operations of grasping and letting go of a load (4).

6. The process according to claim 1, wherein the set-point values ($X^o_p 1$) directed to the macro-manipulator (1) are established in such a way that the macro-manipulator (1) occupies an adjustable position, in the course of a sequence of grasping or letting go of a load (4), so as to reduce the deviation between the real position and the median position of the micro-manipulator (2).

7. The process according to claim 6, wherein the set point values of position ($x^d_c$), assigned to the micro-manipulator (2), result from a subtraction (at 38), from the set-point values of position ($\chi'^d$) of the load grasping device (3), of a magnitude (Xp) which represents the real position of the macro-manipulator (1), which magnitude (Xp) itself is estimated from the position ($X^*_p d$) of the macro-manipulator (1), which is assumed to be rigid, and is corrected (at 39) by the deformation ($\Delta X^\wedge$)

8. The process according to claim 7, including application to a robot manipulator of large size and high capacity for outdoor use, with a motorized carrier (1), constituted by a swivelling mast (7) and an unfolding arm (11) in several elements (12, 13, 14, 15) articulated to one another, and which has, at the end of the unfolding arm (11), a motorized compensator (2) equipped with a grasping device mount for detecting forces in active compliance, in which the carrier (1) constitutes the macro-manipulator and the compensator (2) constitutes the micro-manipulator, the process ensures the distribution of forms of mobility between the carrier (1) and the compensator (2), while controlling the forces of contact in the course of operations of grasping and letting go of a load (4).

9. The process according to claim 6, including application to a robot manipulator of large size and high capacity for outdoor use, with a motorized carrier (1), constituted by a swivelling mast (7) and an unfolding arm (11) in several elements (12, 13, 14, 15) articulated to one another, and which has, at the end of the unfolding arm (11), a motorized compensator (2) equipped with a grasping device mount for detecting forces in active compliance, in which the carrier (1) constitutes the macro-manipulator and the compensator (2) constitutes the micro-manipulator, the process ensures the distribution of forms of mobility between the carrier (1) and the compensator (2), while controlling the forces of contact in the course of operations of grasping and letting go of a load (4).

10. The process according to claim 1, wherein the set-point values of position ($x^{dc}1$) assigned to the micro-manipulator (2), result from a subtraction (at 38), from the set-point values of position ($x'^d$) of the load grasping device (3), of a magnitude (Xp) which represents the real position of the macro-manipulator (1), which magnitude (Xp) itself is estimated from the position ($X^*_p d$) of the macro-manipulator (1), which is assumed to be rigid, and is corrected (at 39) by the deformation ($\Delta X^\wedge$).

11. The process according to claim 1, including application to a robot manipulator of large size and high capacity for outdoor use, with a motorized carrier (1), constituted by a swivelling mast (7) and an unfolding arm (11) in several elements (12, 13, 14, 15) articulated to one another, and which has, at the end of the unfolding arm (11), a motorized compensator (2) equipped with a grasping device mount for detecting forces in active compliance, in which the carrier (1) constitutes the macro-manipulator and the compensator (2) constitutes the micro-manipulator, the process ensures the distribution of forms of mobility between the carrier (1) and the compensator (2), while controlling the forces of contact in the course of operations of grasping and letting go of a load (4).

* * * * *